United States Patent
Ike (10) Patent No.: US 9,382,829 B2
(45) Date of Patent: Jul. 5, 2016

(54) BYPASS EXHAUST PATHWAY TO ALLOW GASES TO BYPASS THE START CATALYST OF A VEHICLE

(71) Applicant: Toyota Motor Engineering & Manufacturing North America, Inc., Erlanger, KY (US)

(72) Inventor: Daniel C. Ike, Anaheim, CA (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 39 days.

(21) Appl. No.: 14/520,135

(22) Filed: Oct. 21, 2014

(65) Prior Publication Data

US 2016/0108787 A1    Apr. 21, 2016

(51) Int. Cl.
*F01N 3/22* (2006.01)
*F01N 3/20* (2006.01)
(Continued)

(52) U.S. Cl.
CPC .............. *F01N 3/2053* (2013.01); *F01N 9/005* (2013.01); *F01N 11/005* (2013.01); *F01N 3/106* (2013.01); *F01N 3/2892* (2013.01); *F01N 13/008* (2013.01); *F01N 2240/20* (2013.01); *F01N 2240/36* (2013.01); *F01N 2410/02* (2013.01); *F01N 2410/03* (2013.01); *F01N 2410/06* (2013.01); *F01N 2550/10* (2013.01); *F01N 2560/025* (2013.01); *F01N 2560/06* (2013.01); *F01N 2900/0412* (2013.01); *F01N 2900/0601* (2013.01); *F01N 2900/08* (2013.01); *F01N 2900/10* (2013.01); *F01N 2900/1602* (2013.01)

(58) Field of Classification Search
CPC ..... F01N 3/106; F01N 3/2053; F01N 3/2892; F01N 9/005; F01N 11/005; F01N 11/007; F01N 13/008; F01N 2240/20; F01N 2240/36; F01N 2410/00; F01N 2410/02; F01N 2410/03; F01N 2410/06; F01N 2560/025; F01N 2560/06; F01N 2900/0412; F01N 2900/0601; F01N 2900/08; F01N 2900/10; F01N 2900/1602
USPC ........... 60/276, 277, 287, 288, 298, 299, 300, 60/320, 324
See application file for complete search history.

(56) References Cited

U.S. PATENT DOCUMENTS 6,012,284 A    1/2000    Tanaka et al.
6,014,859 A    1/2000    Yoshizaki et al.
(Continued)

FOREIGN PATENT DOCUMENTS

DE    3826364    8/1988
EP    0580931    7/1992
(Continued)

*Primary Examiner* — Jorge Leon, Jr.
(74) *Attorney, Agent, or Firm* — Snell & Wilmer LLP (57) ABSTRACT

A system for improving the fuel economy of a vehicle includes an engine configured to produce an initial exhaust gas, a first exhaust pipe connected to the engine, a start catalyst connected to the first exhaust pipe and a second exhaust pipe connected to the start catalyst. The system also includes a bypass exhaust pipe connected to the first exhaust pipe and the second exhaust pipe and a valve positioned at one end of the bypass exhaust pipe and configured to move between a closed position and an open position for directing the initial exhaust gas to the start catalyst and/or the bypass exhaust pipe. The system includes an electronic control unit that is used to control the first valve to be in the closed position or the open position based on an estimated temperature of the start catalyst.

19 Claims, 5 Drawing Sheets

(51) Int. Cl.
    *F01N 11/00*     (2006.01)
    *F01N 9/00*     (2006.01)
    *F01N 3/28*     (2006.01)
    *F01N 13/00*     (2010.01)
    *F01N 3/10*     (2006.01)

(56) References Cited

U.S. PATENT DOCUMENTS

| | | | |
|---|---|---|---|
| 6,513,319 B2 | 2/2003 | Nozawa et al. | |
| 6,523,340 B1* | 2/2003 | Kurihara | F01N 11/005 374/144 |
| 6,945,034 B2 | 9/2005 | Ueno et al. | |
| 7,186,387 B2 | 3/2007 | Yahagi | |
| RE42,156 E | 2/2011 | Hirota et al. | |
| 8,286,418 B2 | 10/2012 | Demura | |
| 8,516,814 B2 | 8/2013 | Okada | |
| 8,607,565 B2 | 12/2013 | Sato | |
| 2004/0230366 A1* | 11/2004 | Ueda | F01N 3/2006 701/108 |
| 2006/0283178 A1* | 12/2006 | Akagawa | B01D 53/9431 60/286 |
| 2009/0282807 A1* | 11/2009 | Rioli | F02D 17/02 60/276 |
| 2010/0205939 A1* | 8/2010 | Sano | F01N 3/0238 60/276 |
| 2012/0204539 A1* | 8/2012 | Gonze | B60K 6/48 60/274 |
| 2013/0213322 A1 | 8/2013 | Takeuchi | |

FOREIGN PATENT DOCUMENTS

| | | |
|---|---|---|
| EP | 0867603 | 9/1998 |
| EP | 0754841 | 4/2004 |
| JP | 2001-295638 | 10/2001 |
| JP | 2011-157922 | 8/2011 |

* cited by examiner

BYPASS EXHAUST PATHWAY TO ALLOW GASES TO BYPASS THE START CATALYST OF A VEHICLE

BACKGROUND

1. Field

The present invention relates generally to an apparatus, system and method that improve the durability and life of a vehicle's start catalyst. More particularly, the present invention relates to a bypass exhaust pathway or pipe that allows exhaust gases to bypass the start catalyst of a vehicle to improve the durability and life of a vehicle's start catalyst.

2. Description of the Related Art

Gasoline powered vehicles generally utilize a start catalyst to clean or purify exhaust gases that exit an internal combustion engine. The start catalyst chemically alters the exhaust gases to reduce the exhaust gas emissions produced by the internal combustion engine to meet or exceed federal and state environmental regulations. In order for the start catalyst to operate and function properly and efficiently, it needs to operate above a minimum operating temperature and below a maximum operating temperature. That is, start catalysts perform in an efficient and optimal manner when their operating temperatures are within a specified range as provided by the manufacturer. When the start catalyst's operating temperature exceeds a maximum operating temperature, the start catalyst's life is reduced.

Several conventional systems have been used to regulate the operating temperature of start catalysts; however, none utilize the components and arrangements of components described herein and none provide the advantages of improved durability and life (i.e., reduced aging) of the start catalyst and improved fuel economy of the vehicle.

SUMMARY

A system for improving the fuel economy of a vehicle includes an engine configured to produce an initial exhaust gas, a first exhaust pipe connected to the engine, a start catalyst connected to the first exhaust pipe and a second exhaust pipe connected to the start catalyst. The system also includes a bypass exhaust pipe connected to the first exhaust pipe and the second exhaust pipe and a valve positioned at one end of the bypass exhaust pipe and configured to move between a closed position and an open position for directing the initial exhaust gas to the start catalyst and/or the bypass exhaust pipe. The system includes an electronic control unit that is used to control the first valve to be in the closed position or the open position based on an estimated temperature of the start catalyst.

A system fir reducing the awing of a start catalyst of a vehicle includes an engine configured to produce an initial exhaust gas, an engine speed sensor configured to determine a speed of the engine and a load sensor configured to determine an amount of torque being output by the engine. The system also includes a first exhaust pipe having a first end for receiving the initial exhaust gas and a second end and a start catalyst having an input connected to the second end of the first exhaust pipe and an output. The system also includes a second exhaust pipe having a first end connected to the output of the start catalyst and a second end and a bypass exhaust pipe having a first end connected to the first exhaust pipe and a second end connected to the second exhaust pipe. The system also includes a valve positioned at the first end of the bypass exhaust pipe and configured to move between a closed position and an open position for directing the initial exhaust gas to the start catalyst or the bypass exhaust pipe. The system also includes an electronic control unit for estimating a temperature of the start catalyst based on the speed of the engine and the amount of torque being output by the engine and controlling the valve to be in the closed position or the open position based on the estimated temperature of the start catalyst.

BRIEF DESCRIPTION OF THE DRAWINGS

Other systems, methods, features, and advantages of the present invention will be or will become apparent to one with skill in the art upon examination of the following figures and detailed description. It is intended that all such additional systems, methods, features, and advantages be included within this description, be within the scope of the present invention, and be protected by the accompanying claims. Component parts shown in the drawings are not necessarily to scale, and may be exaggerated to better illustrate the important features of the present invention. In the drawings, like reference numerals designate like parts throughout the different views, wherein:

DETAILED DESCRIPTION

Several conventional systems have been developed to regulate the operating temperature of start catalysts; however, none utilize the components and arrangements of components described herein and none provide the advantages of improved durability and life (i.e., reduced aging) of the start catalyst and improved fuel economy of the vehicle.

The system includes an engine that outputs an initial exhaust gas, a first exhaust pipe that receives the initial exhaust gas, a second exhaust pipe and a start catalyst located between the first exhaust pipe and the second exhaust pipe. The system also includes a bypass exhaust pipe that bypasses the start catalyst such that some or all of the initial exhaust gas exiting the engine travels through the bypass exhaust pipe and bypasses the start catalyst.

An electronic control unit (ECU) controls a valve at the entrance or exit of the bypass exhaust pipe for determining whether the initial exhaust gas should travel through the start catalyst or through the bypass exhaust pipe. Based on an estimated temperature of the start catalyst, the ECU determines whether to allow all or a majority of the initial exhaust gas to travel through the start catalyst or travel through the bypass exhaust pipe, thus bypassing the start catalyst. As the driver is operating the vehicle, the ECU controls the valve to determine whether the initial exhaust gas from the engine should travel through the start catalyst and/or the bypass exhaust pipe based on the readings from one or more sensors.

The invention provides several advantages such as cooling of the start catalyst, preventing overheating or over temperatures of the start catalyst, increased or improved fuel economy during high loads, reduced catalyst aging and improved durability and life of the start catalyst, and lengthening of the exhaust pathway of the gases exiting the engine prior to the underfloor catalyst.

Figure 1:
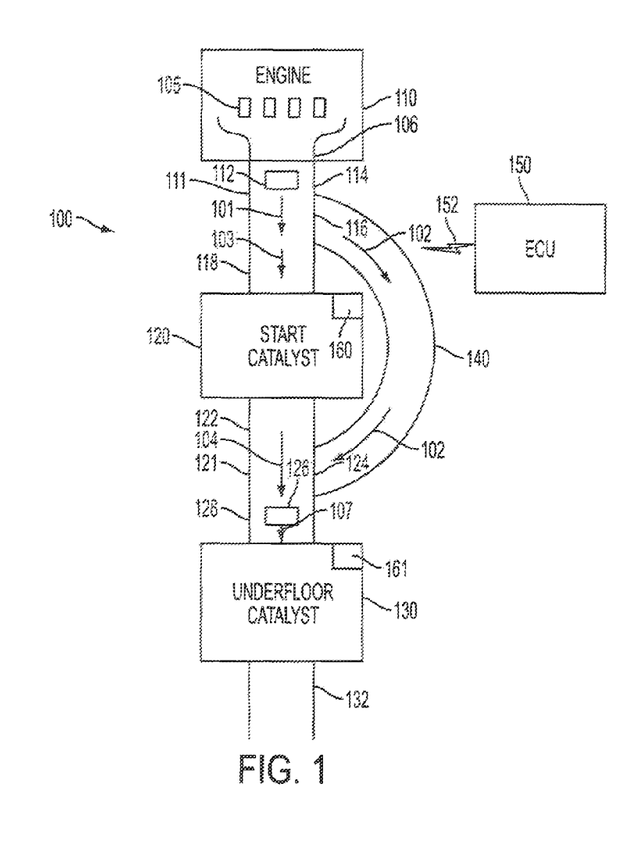
FIG. 1 illustrates a schematic diagram of a system having a bypass exhaust pathway or pipe that allows exhaust gases to bypass a start catalyst of a vehicle to improve the durability and life of the vehicle's start catalyst and to improve the fuel economy of the vehicle according to an embodiment of the present invention.
Figure 2:
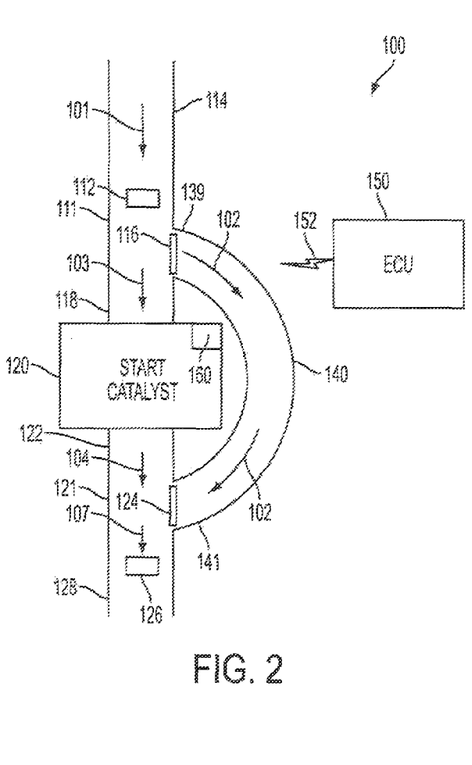
FIG. 2 illustrates an exploded view of the schematic diagram of FIG. 1 according to an embodiment of the present invention.

FIG. 1 illustrates a schematic diagram of a system 100 for improving a vehicle's fuel economy and the durability and life of the vehicle's start catalyst 120. FIG. 2 illustrates an exploded view of the schematic diagram of FIG. 1. The system 100 shown in FIGS. 1 and 2 can be duplicated for dual exhaust manifold systems. For example, many higher cylinder (e.g., 6, 8, 10 and 12) engines utilize dual exhaust manifolds and hence the system 100 can be duplicated for a second exhaust system.

Referring to FIGS. 1 and 2, the system 100 includes an engine 110 having a plurality of cylinders 105 and an output manifold 106 coupled to the plurality of cylinders 105. During operation of the engine 110, the engine 110 produces an initial exhaust gas 101 that is output from the plurality of cylinders 105 to the output manifold 106. From the engine 110, the initial exhaust gas 101 travels from the output manifold 106 into a first exhaust pipe 111. The first exhaust pipe 111 is used to connect the output manifold 106 to the start catalyst 120.

The first exhaust pipe 111 has a first end 114 and a second end 118. In one embodiment, the first end 114 of the first exhaust pipe 111 is connected to the output manifold 106 and the second end 118 of the first exhaust pipe 111 is connected to the start catalyst 120. An inner surface of the first exhaust pipe 111 defines an opening or passageway for carrying the initial exhaust gas 101 and has a first inner diameter (D1) 311 (see also FIG. 3). In one embodiment, the first exhaust pipe 111 has a constant diameter D1 throughout its entire length L1 (see also FIG. 4).

The system 100 may also include an air-fuel sensor 112 that is positioned inside or within the first exhaust pipe 111 for measuring an air-fuel mixture of the initial exhaust gas 101. In one embodiment, the air-fuel sensor 112 is connected to the inner surface of the first exhaust pipe 111. The air-fuel sensor 112 may also be positioned or located within a central portion of the first exhaust pipe 111. As the initial exhaust gas 101 pass through or across the air-fuel sensor 112, the air-fuel sensor 112 is able to detect or measure the air-fuel mixture and transmit a value representing the air-fuel mixture to an electronic control unit ("ECU") 150. The measurements or readings from the air-fuel sensor 112 are transmitted to the ECU 150 via one or more connections 152, which may be wireless and/or wired connections. The ECU 150 communicates via the connections 152 with the various devices and components of the system 100 as described herein.

The system 100 includes a second exhaust pipe 121 that is used to connect the start catalyst 120 to an underfloor catalyst 130. The second exhaust pipe 121 has a first end 122 and a second end 128. In one embodiment, the first end 122 of the second exhaust pipe 121 is connected to the start catalyst 120 and the second end 128 of the second exhaust pipe 121 is connected to the underfloor catalyst 130. An inner surface of the second exhaust pipe 121 defines an opening or passageway for carrying at least a portion of the initial exhaust gas 101 and/or a clean exhaust gas 104 from the start catalyst 120 and has a second inner diameter (D2) 321 (see also FIG. 3). In one embodiment, the second exhaust pipe 121 has a constant diameter D2 throughout its entire length L2 (see also FIG. 4). In one embodiment, the first inner diameter (D1) 311 is substantially the same as the second inner diameter (D2) 321.

The system 100 includes a bypass exhaust pathway or pipe 140 that allows the initial exhaust gas 101 to be partially or completely diverted around the start catalyst 120 for improved fuel economy, reduced aging of the start catalyst 120 and improved durability and life of the start catalyst 120. The bypass exhaust pipe 140 has a first end 139 and a second end 141. The first end 139 of the bypass exhaust pipe 140 is connected to the first exhaust pipe 111. In one embodiment, the first end 139 of the bypass exhaust pipe 140 is connected to the first exhaust pipe 111 at a location between the first end 114 and the second end 118 of the first exhaust pipe 111. In one embodiment, the first end 139 of the bypass exhaust pipe 140 is connected to the first exhaust pipe 111 at a location proximate to the first end 114 or the second end 118 of the first exhaust pipe 111. Connecting the first end 139 at a location proximate to the first end 114 allows for the initial exhaust gas 102 to travel for a greater distance along the bypass exhaust pipe 140 (due to the increased length of the bypass exhaust pipe 140) to increase the amount of cooling of the initial exhaust gas 102 before entering into the underfloor catalyst 130.

The second end 141 of the bypass exhaust pipe 140 is connected to the second exhaust pipe 121. In one embodiment, the second end 141 of the bypass exhaust pipe 140 is connected to the second exhaust pipe 121 at a location between the first end 122 and the second end 128 of the second exhaust pipe 121. In one embodiment, the second end 141 of the bypass exhaust pipe 140 is connected to the second exhaust pipe 121 at a location proximate to the first end 122 or the second end 128 of the second exhaust pipe 121. Connecting the second end 141 at a location proximate to the second end 128 allows for the initial exhaust gas 102 to travel for a greater distance along the bypass exhaust pipe 140 (due to the increased length of the bypass exhaust pipe 140) to increase the amount of cooling of the initial exhaust gas 102 before entering into the underfloor catalyst 130.

Figure 3:
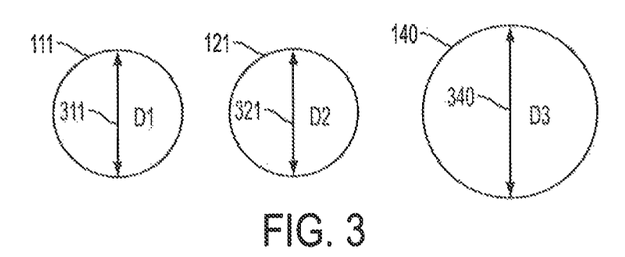
FIG. 3 illustrates cross-sectional views of the first exhaust pipe having a diameter D1, the second exhaust pipe having a diameter D2 and the bypass exhaust pipe having a diameter D3 according to an embodiment of the present invention.

An inner surface of the bypass exhaust pipe 140 defines an opening or passageway for carrying at least a portion of the initial exhaust gas 101 and has a third inner diameter (D3) 340 (see also FIG. 3). In one embodiment, the bypass exhaust pipe 140 has a constant diameter D3 throughout its entire length L3. The constant diameter D3 throughout its entire length L3 advantageously allows for the initial exhaust gas 102 to easily flow through the bypass exhaust pipe 140 without excessive pressure build-up inside the bypass exhaust pipe and allows for the heat from the initial exhaust gas 102 to be dissipated evenly across the entire inner surface of the bypass exhaust pipe 140 thus extending the life of the bypass exhaust pipe 140.

The third inner diameter (D3) 340 is greater than or equal to the first inner diameter (D1) 311 and the second inner diameter (D2) 321. Preferably, the third inner diameter D3 is 1.1 to 1.5 times the diameter of the first inner diameter D1 and the second inner diameter D2. The third inner diameter D3 being greater than the first inner diameter D1 and the second inner diameter D2 advantageously allows for the flow resistance of the initial exhaust gas 102 to be lower, thus allowing the initial exhaust gas 102 to more easily and quickly travel through the bypass exhaust pipe 140 and around the start catalyst 120.

Figure 4:
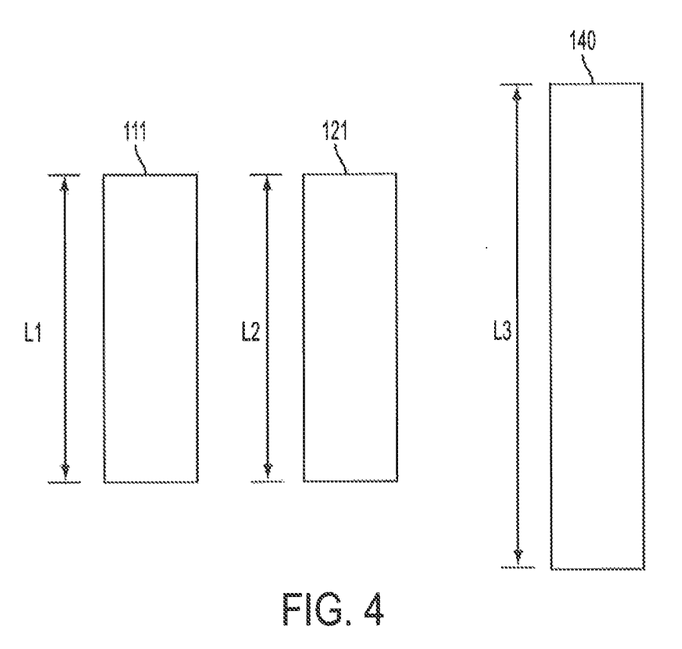
FIG. 4 illustrates cross-sectional views of the first exhaust pipe having a length L1, the second exhaust pipe having a length L2 and the bypass exhaust pipe having a length L3 according to an embodiment of the present invention.

The third length L3 is greater than the sum of the first length L1 and the second length L2. Preferably, the third length L3 is 1.25 to 1.5 times the sum of the first length L1 and the second length L2. The third length L3 is greater than the sum of the first length L1 and the second length L2 to advantageously provide a larger surface area for the initial exhaust gas 102 to pass across and come into contact with in order to dissipate heat energy to cool the initial exhaust gas 102 as it travels through the bypass exhaust pipe 140. The cooler exhaust gas 102 being fed into the underfloor catalyst 130 is advantageous for a more efficient operation and longer life of the underfloor catalyst 130.

The larger diameter D3 and the longer length L3 allow for a greater surface area to dissipate the heat of and cool the temperature of the initial exhaust gas 102 travelling therethrough. In one embodiment, the lengths and diameters of the first exhaust pipe 111, the second exhaust pipe 121 and the bypass exhaust pipe 140 are configured to have dimensions that allow the initial exhaust gas 101 to travel from the first valve 116 to the second valve 124 in approximately the same amount of time regardless of whether the initial exhaust gas 101 travels through the start catalyst 120 or around the start catalyst 120 via the bypass exhaust pipe 140. This advantageously prevents buildup of pressure of the exhaust gases and allows the exhaust gases to properly and efficiently bypass the start catalyst 120 or be combined when rejoined together near the second valve 124.

The bypass exhaust pipe 140 allows gases emitted from the engine 110 to partially or completely bypass the start catalyst 120 of a vehicle. The initial exhaust gas 101 from the engine 110 is directed towards the start catalyst 120. At or proximate to the connection location of the bypass exhaust pipe 140 and the first exhaust pipe 111, a first valve 116 is positioned for allowing or directing the initial exhaust gas 101 to travel to the start catalyst 120 and/or to enter into the bypass exhaust pipe 140. The ECU 150 controls the operation and position of the first valve 116. After bypassing the start catalyst 120, the initial exhaust gas 102 (denoted as 102 when in the bypass exhaust pipe 140) is reintroduced into the main exhaust path and combined with the exhaust gases 104 exiting the start catalyst 120. Once the two streams are mixed together, the combined stream 107 passes through the oxygen sensor 126 and/or the underfloor catalyst 130.

Figure 5:
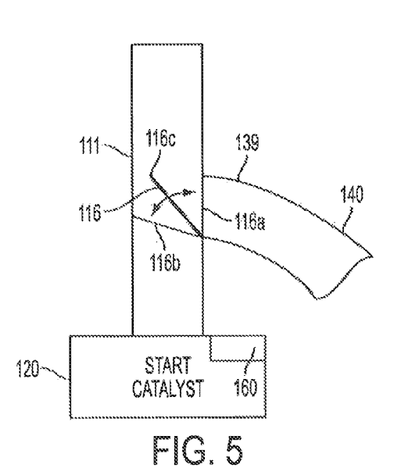
FIG. 5 illustrates an exploded view of a first valve positioned at the connection of the first exhaust pipe and the bypass exhaust pipe according to an embodiment of the present invention.

FIG. 5 illustrates an exploded view of a first valve 116 positioned at the connection of the first exhaust pipe 111 and the bypass exhaust pipe 140. In one embodiment, the first valve 116 is formed in the shape of a circle, which is similar to the cross-sectional shape of the first exhaust pipe 111, the second exhaust pipe 121 and the bypass exhaust pipe 140. This allows the first valve 116 to completely close the openings of the exhaust pipes. In one embodiment, the first valve 116 is a butterfly valve.

The first valve 116 is designed and configured to move between a closed position 116a, a completely open position 116b and a partially open position 116c. In the closed position 116a, the first valve 116 completely covers the entrance or opening into the bypass exhaust pipe 140, thus allowing the entire initial exhaust gas 101 to be directed towards the start catalyst 120. The start catalyst 120 is configured to receive the initial exhaust gas 101 and output a clean exhaust gas 104. In the open position 116b, the first valve 116 completely covers the entrance or opening to the start catalyst 120, thus allowing the entire initial exhaust gas 101 to be directed around the start catalyst 120 and through the bypass exhaust pipe 140. In the partially open position 116c, the first valve 116 is partially open and partially closed, thus allowing the initial exhaust gas 101 to be directed to both the start catalyst 120 and the bypass exhaust pipe 140. The first valve 116 can be used solely or in combination with the second valve 124 to provide better control and flow of the gases through the system 100.

Figure 6:
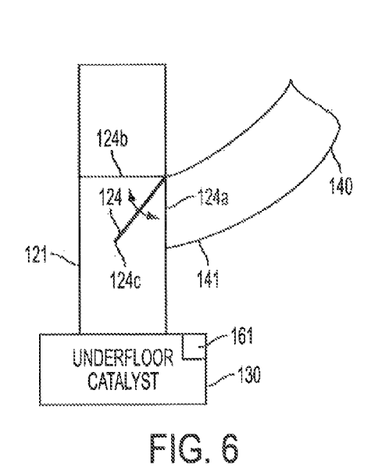
FIG. 6 illustrates an exploded view showing a second valve positioned at the connection of the second exhaust pipe and the bypass exhaust pipe according to an embodiment of the present invention.

FIG. 6 illustrates an exploded view of a second valve 124 positioned at the connection of the second exhaust pipe 121 and the bypass exhaust pipe 140. In one embodiment, the second valve 124 is formed in the shape of a circle, which is similar to the cross-sectional shape of the first exhaust pipe 111, the second exhaust pipe 121 and the bypass exhaust pipe 140. This allows the second valve 124 to completely close the exits of the exhaust pipes. In one embodiment, the second valve 124 is a butterfly valve.

The second valve 124 is designed and configured to move between a closed position 124a, a completely open position 124b and a partially open position 124c. In the closed position 124a, the second valve 124 completely covers the exit of the bypass exhaust pipe 140, thus preventing the initial exhaust gas 101 from passing to the underfloor catalyst 130 but allowing the initial exhaust gas 101 to pass through the start catalyst 120. In the open position 124b, the second valve 124 completely covers the exit after the start catalyst 120, thus allowing the initial exhaust gas 101 to be directed around the start catalyst 120 and through the bypass exhaust pipe 140. In the partially open position 124c, the second valve 124 is partially open and partially closed, thus allowing the initial exhaust gas 101 to be directed to both the start catalyst 120 and the bypass exhaust pipe 140. The second valve 124 can be used solely or in combination with the first valve 116 to provide better control and flow of the exhaust gases through the system 100.

The system 100 may also include an oxygen sensor 126 that is positioned inside or within the second exhaust pipe 121 for measuring an amount of oxygen of a combined exhaust gas 107, which includes the clean exhaust gas 104 from the start catalyst 120 and the initial exhaust gas 102. In one embodiment, the oxygen sensor 126 is connected to the inner surface of the second exhaust pipe 121. The oxygen sensor 126 may also be positioned or located within a central portion of the second exhaust pipe 121. The measurements or readings from the oxygen sensor 126 are transmitted to the ECU 150 via a connection 152, which may be a wireless or wired connection.

Figure 7:
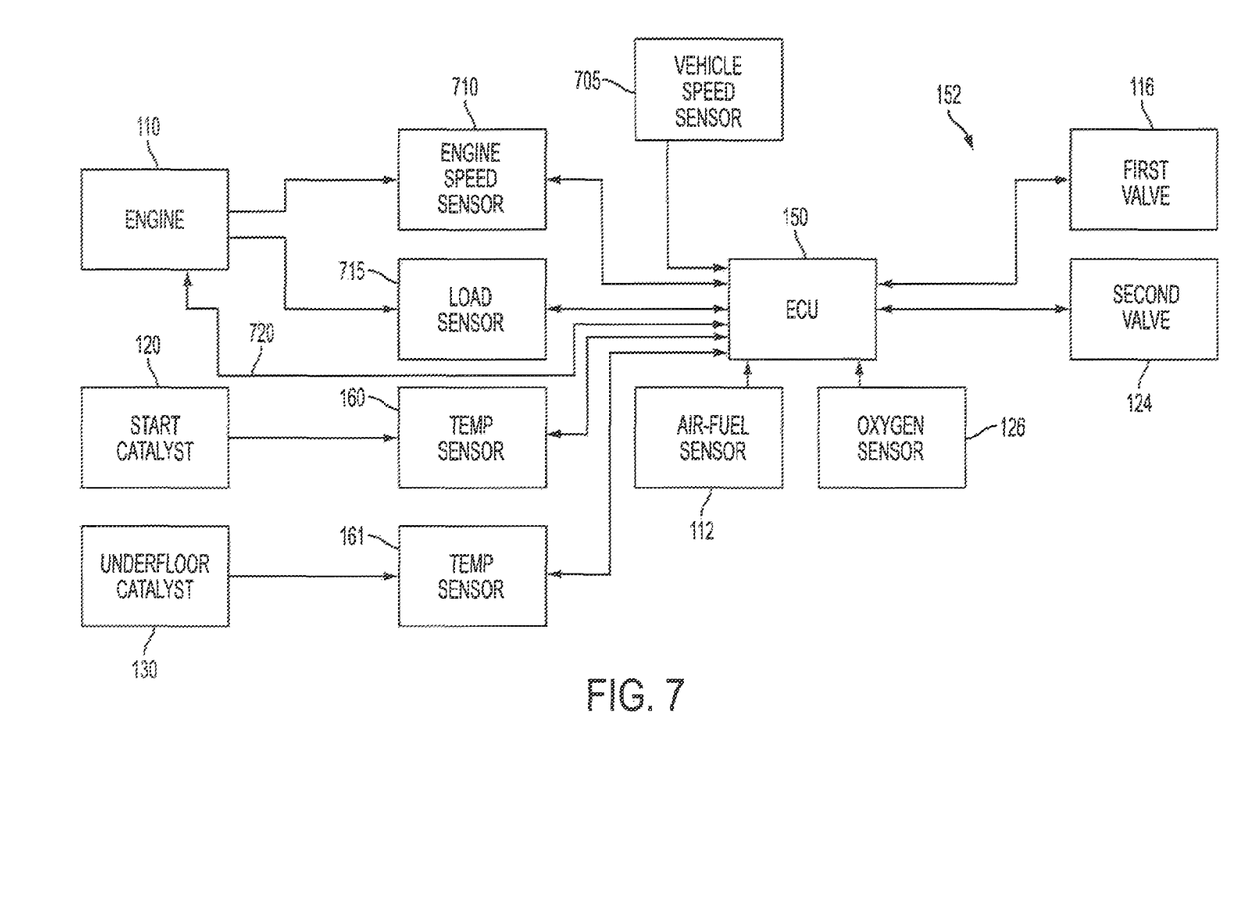
FIG. 7 illustrates a block diagram of the input and output signals to and from the ECU according to an embodiment of the present invention.

FIG. 7 illustrates a block diagram of the input and output signals to and from the ECU 150. The ECU 150 controls the opening and closing of the first valve 116 and/or the second valve 124 based on inputs received from one or more components or devices. For example, the ECU 150 may receive input signals from a vehicle speed sensor 705, an engine speed sensor 710, a load sensor 715, the temperature sensor 160, the temperature sensor 161, the air-fuel sensor 112 and/or the oxygen sensor 126. In one embodiment, the ECU 150 controls the opening and closing of the first valve 116 and/or the second valve 124 based on the estimated temperature of the start catalyst 120 (discussed in FIG. 8). For example, if the estimated temperature of the start catalyst 120 is greater than or equal to a predetermined high temperature (defined below), the ECU 150 will partially or completely open the first valve 116 and/or the second valve 124 in order to divert some or all of the initial exhaust gas 101 through the bypass exhaust pipe 140. Alternatively, if the estimated temperature of the start catalyst 120 is less than a predetermined high temperature (defined below), the ECU 150 may close the first valve 116 and/or the second valve 124. In one embodiment, if the estimated temperature of the start catalyst 120 is less than a predetermined high temperature (defined below), the ECU 150 may still partially open the first valve 116 and/or the second valve 124 in order to keep the temperature of the start catalyst 120 within a certain range below the predetermined high temperature.

The vehicle speed sensor 705 determines a speed of the vehicle. The vehicle speed sensor 705 can be coupled to the transmission, the rear differential assembly or the wheel assembly and is electrically connected with the ECU 150. The vehicle speed sensor 705 is configured to determine or sense a speed of the vehicle (e.g., mph or kph). The vehicle speed sensor 705 outputs values that are used by the ECU 150 to determine whether to open or close the first valve 116 and/or the second valve 124.

The engine speed sensor 710 determines an engine speed of the engine 110. The engine speed sensor 710 is coupled to the engine 110 and electrically connected with the ECU 150. The engine speed sensor 710 is configured to determine or sense a speed of the engine (e.g., RPM). The engine speed sensor 710 outputs values that are used by the ECU 150 to determine whether to open or close the first valve 116 and/or the second valve 124.

The load sensor 715 determines an amount of torque being output by the engine 110. The load sensor 715 is coupled to the engine 110 and electrically connected with the ECU 150. The load sensor 715 outputs values that are used by the ECU 150 to determine whether to open or close the first valve 116 and/or the second valve 124.

The spark retard signal 720 is an output signal from the ECU 150 to the engine 110 to control spark timing. The more spark retard indicates a later ignition resulting in hotter exhaust temperatures from the engine 110. The hotter exhaust temperatures create more heat stress on the start catalyst 120 and the underfloor catalyst 130. Therefore, the spark retard signal 720 may be an input for the estimated catalyst temperature.

Figure 8:
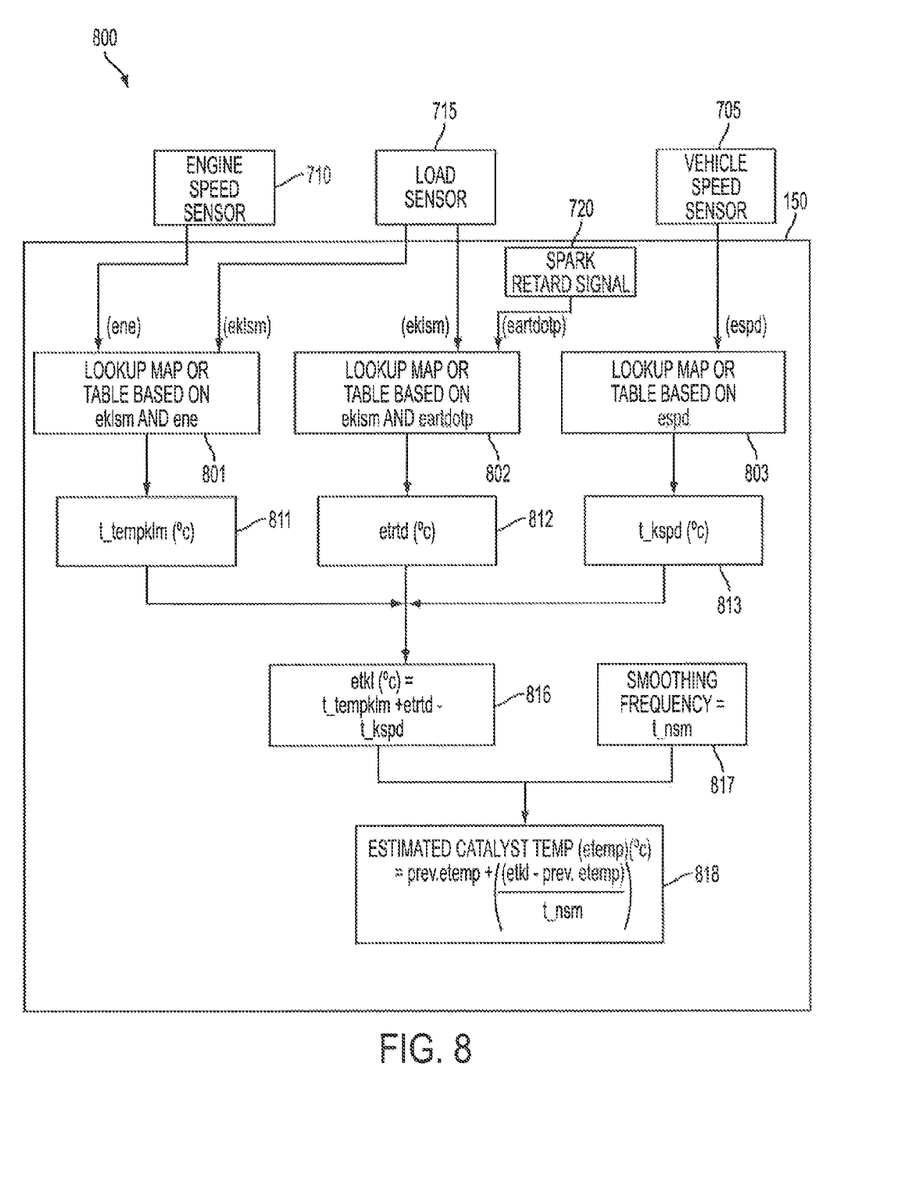
FIG. 8 illustrates a flowchart of a method for estimating a current or an operating temperature of the start catalyst according to an embodiment of the present invention.

The temperature sensor 160 may not be needed if the ECU 150 estimates the temperature of the start catalyst 120 as discussed in FIG. 8. The temperature sensor 160 determines a temperature of the start catalyst 120. The temperature sensor 160 is coupled to the start catalyst 120 and electrically connected with the ECU 150. The ECU 150 interfaces with or receives signals or information from the temperature sensor 160 in order to determine the temperature of the start catalyst 120 for controlling whether to bypass the start catalyst 120 by opening or closing the first valve 116 and/or the second valve 124. For example, when the temperature sensor 160 indicates that the temperature of the start catalyst 120 is greater than or equal to an overheating temperature (e.g., 950 degrees Celsius—preferably set by the manufacturer), the ECU 150 causes (i.e., sends a signal to) the first valve 116 to move to the open position 116*b* (and the second valve 124 to move to the open position 124*b*) to bypass the start catalyst 120 and allow the initial exhaust gas 101 to be directed through the bypass exhaust pipe 140. This prevents the start catalyst 120 from overheating.

The temperature sensor 161 may not be needed if the ECU 150 estimates the temperature of the underfloor catalyst 130 as discussed in FIG. 8. The temperature sensor 161 determines a temperature of the underfloor catalyst 130. The temperature sensor 161 is coupled to the underfloor catalyst 130 and electrically connected with the ECU 150. The ECU 150 interfaces with or receives signals or information from the temperature sensor 161 in order to determine the temperature of the underfloor catalyst 130 for controlling whether to bypass the start catalyst 120 in order to more quickly heat up the underfloor catalyst 130 by opening or partially opening the first valve 116 and/or the second valve 124. For example, when the temperature sensor 161 indicates that the temperature of the underfloor catalyst 130 is less than an efficient operating temperature (e.g., between 250-350 degrees Celsius—preferably set by the manufacturer), the ECU 150 causes (i.e., sends a signal to) the first valve 116 to move to the open position 116*b* or partially open position 116*c* (and the second valve 124 to move to the open position 124*b* or partially open position 124*c*) to allow the initial exhaust gas 101 to be directed through the bypass exhaust pipe 140 and to the underfloor catalyst 130. This allows the initial exhaust gas 101 to be directed to the start catalyst 120 and/or the underfloor catalyst 130 to allow one or both to be heated up to efficient operating temperatures more quickly.

Based on the temperatures of the start catalyst 120 and/or the underfloor catalyst 130, the ECU 150 can control the valves to direct the exhaust gases to heat up or cool the start catalyst 120 and/or the underfloor catalyst 130. The underfloor catalyst 130 generally operates at cooler temperatures during normal conditions because it is downstream where the exhaust gases are cooler. By having control of the valves, the ECU 150 can have a transitional phase from 'normal' operation, by directing flow to both the start catalyst 120 and the underfloor catalyst 130. This will allow the underfloor catalyst 130 to heat up to efficient operating temperatures but also passing cleaner exhaust through the start catalyst 120 since the underfloor catalyst 130 will not be able to reduce the emissions as much during this period. Once the operating temperature of the underfloor catalyst 130 is reached, then all the exhaust gases can be directed to the bypass exhaust pipe 140 or the start catalyst 120.

The air-fuel sensor 112 may provide signals to the ECU 150. The air-fuel sensor 112 is used to monitor the engine output performance. Based on these signals, the ECU 150 adjusts the amount of fuel injected into the intake air stream. The air-fuel sensor 112 can be replaced with an oxygen sensor.

The oxygen sensor 126 may provide signals to the ECU 150. The oxygen sensor 126 is used to monitor the start catalyst 120 performance. Based on these signals, the ECU 150 adjusts the amount of fuel injected into the intake air stream. The oxygen sensor 126 can be replaced with an air-fuel sensor.

During normal operating conditions, the engine 110 targets stoichiometric burn for a cleaner more efficient burn. When the ECU 150 detects or determines that the temperature of the start catalyst 120 is equal to or above a predetermined high temperature, which is below (e.g., 50-100 degrees Celsius below) the maximum operating temperature of the start catalyst 120, the ECU 150 controls or allows the engine 110 to receive an enriched air/fuel mixture (i.e., more fuel) in order to produce a lower temperature burn, which in turn outputs a lower exhaust temperature to the start catalyst 120. The enriched air/fuel mixture, however, reduces the fuel economy or efficiency of the vehicle. The invention described herein minimizes and generally eliminates the need for introducing the enriched air/fuel mixture to the engine 110, thus improving the fuel economy or efficiency of the vehicle. That is, the invention described herein controls and generally prevents the temperature of the start catalyst 120 from reaching or exceeding the predetermined high temperature (or maximum operating temperature) by diverting the initial exhaust gas 101 through the bypass exhaust pipe 140 to prevent excessive heating/overheating of the start catalyst 120. This minimizes and potentially eliminates the need to introduce an enriched air/fuel mixture to the engine 110 to provide a lower temperature burn (thus increasing the fuel economy) because the system 100 causes a reduced operating temperature of the start catalyst 120. In addition, the invention described herein also provides a longer start catalyst life due to the lower amount of high temperature exhaust gases passing through the start catalyst 120.

FIG. 8 illustrates a flowchart 800 of a method for estimating a current or an operating temperature of the start catalyst 120. This method can also be used to estimate a current or an operating temperature of the underfloor catalyst 130. FIG. 8 is an example of a method of estimating a temperature of the start catalyst 120 and other methods may be used that are within the scope of the present invention. The ECU 150 receives inputs from one or more devices or sensors. For example, the ECU 150 may receive an input value (ene) from the engine speed sensor 710, an input value (eklsm) from the load sensor 715, an input value (eartdotp) representing the spark retard signal 720, and/or an input value (espd) from the vehicle speed sensor 705.

The ECU 150 accesses a lookup map or table based on the values eklsm and ene at step 801 to determine t_tempklm (degrees C.) at step 311. The value t_tempklm (degrees C.) is a first exhaust temperature output. The ECU 150 accesses a lookup map or table based on the values eklsm and eartdotp at step 802 to determine etrtd (degrees C.) at step 812. The value etrtd (degrees C.) is a second exhaust temperature output. The ECU 150 accesses a lookup map or table based on the value espd at step 803 to determine t_kspd (degrees C.) at step 813. The value t_kspd (degrees C.) is a cooling factor due to the vehicle travelling at a certain speed.

At step 816, the ECU 150 determines etkl (degrees C.) using the formula etkl (degrees C.)=t_tempklm (degrees C.)+etrtd (degrees C.)−t_kspd (degrees C.). The etkl (degrees C.) is a steady state catalyst temperature. The smoothing frequency 817 is used to smooth out the values received from the lookup maps or tables. At step 818, the estimated start catalyst temperature is determined using the formula etemp (degrees C.)=previous etemp (degrees C.)+((etkl−previous etemp)/t_nsm)). Generally, the start catalyst temperature is estimated using this method 800 when a temperature sensor 160 is not present or is not functioning properly.

The various illustrative logical blocks, modules, and algorithm steps described in connection with the examples disclosed herein may be implemented as electronic hardware, computer software, or combinations of both. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosed apparatus and methods.

The steps of a method or algorithm described in connection with the examples disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an Application Specific Integrated Circuit (ASIC). The ASIC may reside in a wireless modem. In the alternative, the processor and the storage medium may reside as discrete components in the wireless modem.

Exemplary embodiments of the invention have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A system for improving fuel economy of a vehicle, the system comprising:
   an engine having a plurality of cylinders and an output manifold coupled to the plurality of cylinders, the engine configured to produce an initial exhaust gas;
   a first exhaust pipe having a first end connected to the output manifold and a second end, the first exhaust pipe defining a first inner diameter;
   a start catalyst having an output and an input connected to the second end of the first exhaust pipe;
   a second exhaust pipe having a first end connected to the output of the start catalyst and a second end;
   a bypass exhaust pipe having a first end connected to the first exhaust pipe and a second end connected to the second exhaust pipe, the bypass exhaust pipe defining a third inner diameter that is the same or larger than the first inner diameter of the first exhaust pipe;
   an underfloor catalyst having an output and an input connected to the second end of the second exhaust pipe;
   a first valve positioned at the first end of the bypass exhaust pipe and configured to move between a partially open position, a closed position and an open position for directing the initial exhaust gas to the start catalyst, the bypass exhaust pipe or both;
   an engine speed sensor configured to determine a speed of the engine;
   a load sensor configured to determine an amount of torque being output by the engine;
   a vehicle speed sensor configured to determine a speed of the vehicle; and
   an electronic control unit configured to estimate a temperature of the start catalyst and a temperature of the underfloor catalyst based on the speed of the engine, the amount of torque being output by the engine, and the speed of the vehicle and control a movement of the first valve between the partially open position, the closed position and the open position based on the estimated temperature of the start catalyst and the estimated temperature of the underfloor catalyst.

2. The system of claim 1 further comprising an air-fuel sensor, positioned within the first exhaust pipe, for monitoring an output performance of the engine and transmitting a signal representing the output performance to the electronic control unit.

3. The system of claim 1 further comprising an oxygen sensor, positioned within the second exhaust pipe, for monitoring a performance of the start catalyst and transmitting a signal representing the performance to the electronic control unit.

4. The system of claim 1 further comprising a second valve positioned at the second end of the bypass exhaust pipe and configured to move between a closed position and an open position for directing the initial exhaust gas to the start catalyst or the bypass exhaust pipe.

5. The system of claim 1 further comprising a temperature sensor coupled to the start catalyst and configured to estimate or determine the temperature of the start catalyst.

6. The system of claim 1 wherein the second exhaust pipe defines a second inner diameter that is substantially the same as the first inner diameter.

7. The system of claim 1 wherein the electronic control unit is further configured to control the first valve to open when the estimated temperature of the start catalyst is equal to or above a predetermined high temperature, which is below a maximum operating temperature of the start catalyst.

8. The system of claim 1 wherein the electronic control unit is further configured to control the first valve to close when the estimated temperature of the start catalyst is equal to or below a predetermined high temperature, which is below a maximum operating temperature of the start catalyst.

9. The system of claim 1 wherein the electronic control unit is further configured to maintain the estimated temperature of the start catalyst within a first temperature range and the estimated temperature of the underfloor catalyst within a second temperature range, the first temperature range being at a higher temperature range than the second temperature range.

10. The system of claim 1 wherein the electronic control unit is further configured to control the first valve to be partially open to direct the initial exhaust gas to both the start catalyst and the underfloor catalyst to allow the underfloor catalyst to heat up to efficient operating temperatures and to allow a portion of the initial exhaust gas to pass through the start catalyst.

11. The system of claim 1 wherein the first exhaust pipe has a first length, the second exhaust pipe has a second length and the bypass exhaust pipe has a third length which is greater than a sum of the first length and the second length.

12. A system for reducing aging of a start catalyst of a vehicle, the system comprising:
    an engine configured to produce an initial exhaust gas;
    a first exhaust pipe having a first end for receiving the initial exhaust gas and a second end, the first exhaust pipe defining a first diameter;
    a start catalyst having an input connected to the second end of the first exhaust pipe and an output;
    a second exhaust pipe having a first end connected to the output of the start catalyst and a second end, the second exhaust pipe defining a second diameter;
    a bypass exhaust pipe having a first end connected to the first exhaust pipe and a second end connected to the second exhaust pipe, the bypass exhaust pipe defining a third diameter that is the same or larger than the first diameter of the first exhaust pipe and that is the same or larger than the second diameter of the second exhaust pipe;
    an underfloor catalyst having an output and an input connected to the second end of the second exhaust pipe;
    a valve positioned at the first end of the bypass exhaust pipe and configured to move between a partially open position, a closed position and an open position for directing the initial exhaust gas to the start catalyst, the bypass exhaust pipe or both;
    an engine speed sensor configured to determine a speed of the engine;
    a load sensor configured to determine an amount of torque being output by the engine; and
    an electronic control unit configured to estimate a temperature of the start catalyst and a temperature of the underfloor catalyst based on the speed of the engine and the amount of torque being output by the engine and control a movement of the valve between the partially open position, the closed position and the open position based on the estimated temperature of the start catalyst and the estimated temperature of the underfloor catalyst to maintain the estimated temperature of the start catalyst within a first temperature range and the estimated temperature of the underfloor catalyst within a second temperature range.

13. The system of claim 12 further comprising a vehicle speed sensor configured to determine a speed of the vehicle, and wherein the electronic control unit is further configured to estimate the temperature of the start catalyst based on the speed of the vehicle.

14. The system of claim 13 wherein the first temperature range is different from the second temperature range.

15. The system of claim 12 wherein the second diameter is substantially the same as the first diameter.

16. The system of claim 12 wherein the electronic control unit is further configured to control the valve to open when the estimated temperature is equal to or above a predetermined high temperature, which is below a maximum operating temperature of the start catalyst.

17. The system of claim 12 wherein the electronic control unit is further configured to control the valve to close when the estimated temperature is equal to or below a predetermined high temperature, which is below a maximum operating temperature of the start catalyst.

18. The system of claim 12 wherein the electronic control unit controls the valve to be partially open to direct the initial exhaust gas to both the start catalyst and the underfloor catalyst to allow the underfloor catalyst to heat up to efficient operating temperatures and to allow a portion of the initial exhaust gas to pass through the start catalyst.

19. The system of claim 12 wherein the first exhaust pipe has a first length, the second exhaust pipe has a second length and the bypass exhaust pipe has a third length which is greater than a sum of the first length and the second length.

* * * * *